United States Patent
Meyer

(10) Patent No.: US 9,463,967 B1
(45) Date of Patent: Oct. 11, 2016

(54) LIFT FOR MOTORCYCLES AND SMALL VEHICLES WITH RATCHET HEIGHT ADJUSTMENT MECHANISM

(71) Applicant: Larry Meyer, Wellington, FL (US)

(72) Inventor: Larry Meyer, Wellington, FL (US)

( * ) Notice: Subject to any disclaimer, the term of this patent is extended or adjusted under 35 U.S.C. 154(b) by 306 days.

(21) Appl. No.: 14/223,362

(22) Filed: Mar. 24, 2014

Related U.S. Application Data

(60) Provisional application No. 61/804,337, filed on Mar. 22, 2013.

(51) Int. Cl.
| | |
|---|---|
| *B66F 5/00* | (2006.01) |
| *B66F 5/04* | (2006.01) |
| *B66F 17/00* | (2006.01) |
| *B60P 1/48* | (2006.01) |

(52) U.S. Cl.
CPC .................. *B66F 5/00* (2013.01); *B66F 17/00* (2013.01); *B60P 1/48* (2013.01); *B66F 5/04* (2013.01)

(58) Field of Classification Search
CPC ............ B66F 5/00; B66F 5/025; B66F 7/00; B66F 7/0641; B66F 2400/02; B66F 2700/025; B66F 2700/12
USPC .......................................... 269/17; 254/10 R
See application file for complete search history.

(56) References Cited

U.S. PATENT DOCUMENTS

| | | | | |
|---|---|---|---|---|
| 1,240,496 | A * | 9/1917 | Seymour | B66F 7/0641 |
| | | | | 248/166 |
| 2,201,179 | A * | 5/1940 | Jackson | B66F 7/0641 |
| | | | | 254/91 |
| 3,958,793 | A * | 5/1976 | Garate | B66F 5/04 |
| | | | | 254/10 B |
| 4,548,387 | A * | 10/1985 | Saccoccia | B66F 7/0625 |
| | | | | 254/10 B |
| 6,598,855 | B1 * | 7/2003 | Petrone | B66F 7/0625 |
| | | | | 254/10 R |
| 6,966,542 | B2 | 11/2005 | Bettencourt | |
| 7,066,448 | B2 | 6/2006 | Thurm | |
| 7,175,159 | B1 | 2/2007 | Gomillion | |
| D596,823 | S | 7/2009 | Thurm | |
| D640,440 | S | 6/2011 | Thurm | |
| 2011/0147683 | A1 * | 6/2011 | Chen | B66F 19/00 |
| | | | | 254/134 |
| 2011/0253955 | A1 * | 10/2011 | Gann | B66F 3/22 |
| | | | | 254/10 R |

* cited by examiner

*Primary Examiner* — Joseph J Hail
*Assistant Examiner* — J Stephen Taylor
(74) *Attorney, Agent, or Firm* — Mark D. Bowen; Malin Haley DiMaggio & Bowen, P.A.

(57) ABSTRACT

An improved small vehicle lift having an automatically engaging ratchet mechanism that functions to fix the lift at one of a plurality of lift height positions. A pair of generally identical toothed ratchet plates are affixed to lower link members which form the parallelogram linkage, and which that are pivotally connected to the center support post. The support comprises a generally hollow ember having opposing sides each defining longitudinally disposed slotted apertures. A catch is retained by a carrier riding within the support and is received within said slotted apertures and projects laterally from the center support post. The catch is spring biased to an upper position such that the catch will automatically engage the toothed ratchet plate.

2 Claims, 8 Drawing Sheets

LIFT FOR MOTORCYCLES AND SMALL VEHICLES WITH RATCHET HEIGHT ADJUSTMENT MECHANISM

CROSS REFERENCE TO RELATED APPLICATIONS

This application claims the benefit of provisional U.S. Patent Application Ser. No. 61/804,337 filed on Mar. 22, 2013.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to an apparatus for lifting small vehicles such as motorcycles for maintenance and storage, and more particularly to a lift apparatus adapted with multi-position ratchet mechanism to allow the lift to be fixed at various heights.

2. Description of Related Art

The use of lifts to raise and lower small vehicles, such as motor cycles, is well known it the art. The present inventor has contributed to advancements in the art of mechanical lifts as disclosed in U.S. Pat. Nos. 6,598,855 and 7,004,454, each titled Motorcycle and Small Vehicle Lift, the disclosures of which are incorporated herein by reference in their entireties. FIGS. 1 and 2 are illustrations of the prior art vehicle lift disclosed in U.S. Pat. No. 6,598,855. The prior art lift systems are generally characterized as having base frame having a pair of ground engaging caster assemblies and a pair of horizontally extending divergent legs each having an inner end attached to the base frame and an outer end with a roller attached thereto, the casters and the rollers permitting the lift apparatus to roll across the ground surface. A dual parallelogram linkage includes a pair of the posts attached to the base frame and is attached to vehicle support arms. An actuator is connected between the linkage and the base frame and is manually actuated to selectively raise and lower the vehicle support arms between a lowered position for engaging and disengaging from a vehicle and a fully raised position. The actuator may be an electrically powered hydraulic actuator system.

One limitation present with this prior art vehicle lift system relates to the mechanism used to fix the lift at a desired height. The lifts disclosed in the '855 and '454 patents each rely on locking plates having a plurality of apertures formed therein. The apertures define stop positions at which the vehicle support arms may be fixed above the supporting surface. A pin is manually inserted through corresponding ones of said apertures prevent downward rotation of the support arms thereby allowing the vehicle to be fixed at a variety of height positions. This mechanism, however, is burdened with a number of limitations and disadvantages. One such disadvantage is that the mechanism does not automatically engage, but rather requires the user to manually insert the pin which is found dangling from a chain. In addition, the mechanism is located below the support arms thereby presenting poor ergonomics that require the user to bend down below the supported vehicle in order to insert the pin. The use of a pair of plates further requires aligned insertion of the pin, which can be difficult when operating at an awkward position.

In view of the limitations and disadvantages present in the art, there remains a need for further advancements in the art of small vehicle lift systems.

BRIEF SUMMARY OF THE INVENTION

The present invention overcomes the limitations and disadvantages present in the art by providing an improved small vehicle lift having an automatically engaging ratchet mechanism that functions to fix the lift at one of a plurality of lift height positions. A pair of generally identical toothed ratchet plates are affixed to lower link members which form the parallelogram linkage, and which that are pivotally connected to the center support post. The support comprises a generally hollow member having opposing sides each defining longitudinally disposed slotted apertures. A catch is retained by a carrier riding within the support and is received within said slotted apertures and projects laterally from the center support post. The catch is spring biased to an upper position such that the catch will automatically engage the toothed ratchet plate. A rod having proximal end disposed at an ergonomic location and a distal end connected to the carrier allows for manual disengagement of catch to allow for simple lowering of the lift. A pneumatic cylinder is in fluid communication with an air compressor and functions to raise lift upon introduction of compressed air. An air release valve functions to allow the lift to lower upon venting of the compressed air.

Accordingly, it is an object of the present invention to provide an improved lift apparatus for use with small vehicles, such as motorcycles.

Another object of the present invention is to provide a vehicle lift apparatus having an automatically engaging ratchet mechanism that functions to fix the lift at a desired height.

Still another object of the present invention is to provide an ergonomic mechanism for disengaging the ratchet.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawings FIGS. 3-8 depict an improved vehicle lift, generally referenced as 10, adapted with an automatic lift locking mechanism, generally referenced as 40, that allows for ratchet assisted height adjustment in accordance with the present invention. The present invention provides an improved lift having an automatically engaging ratchet that functions to fix the lift at one of a plurality of lift height positions.

Figure 1:
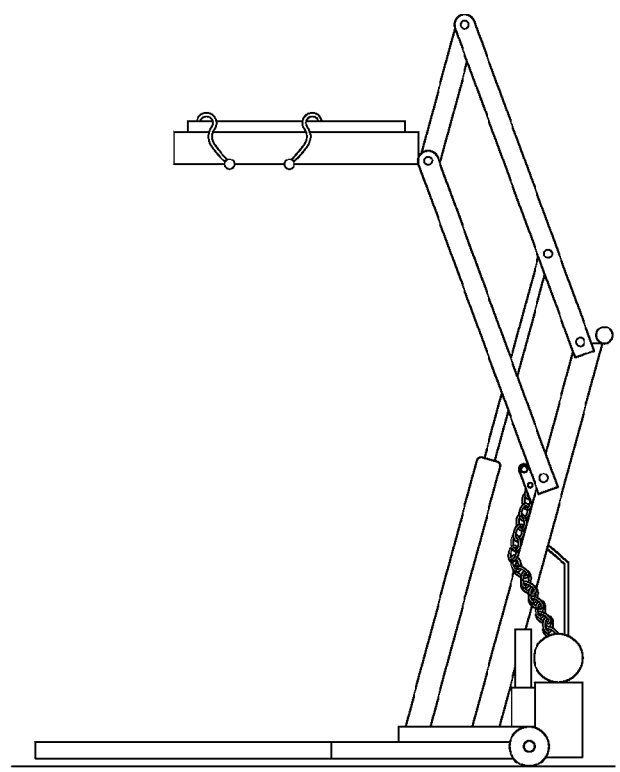
FIG. 1 depicts a lift for small vehicles adapted with a height adjustment stop mechanism in accordance with the prior art.
Figure 2:
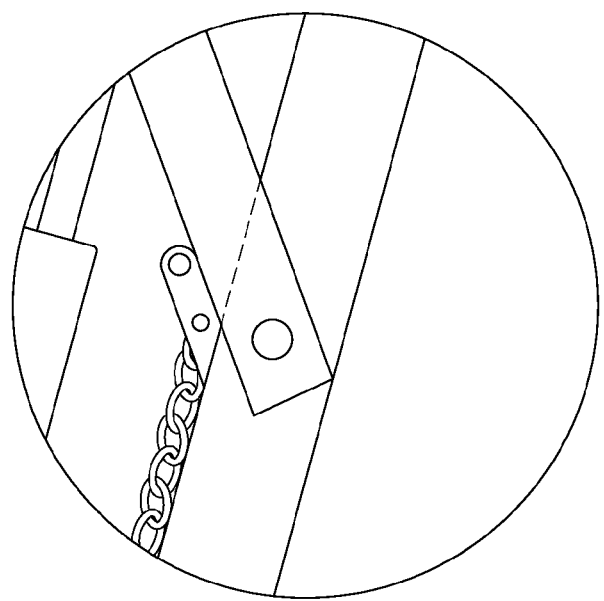
FIG. 2 depicts a detailed view of the prior art height adjustment mechanism.
Figure 3:
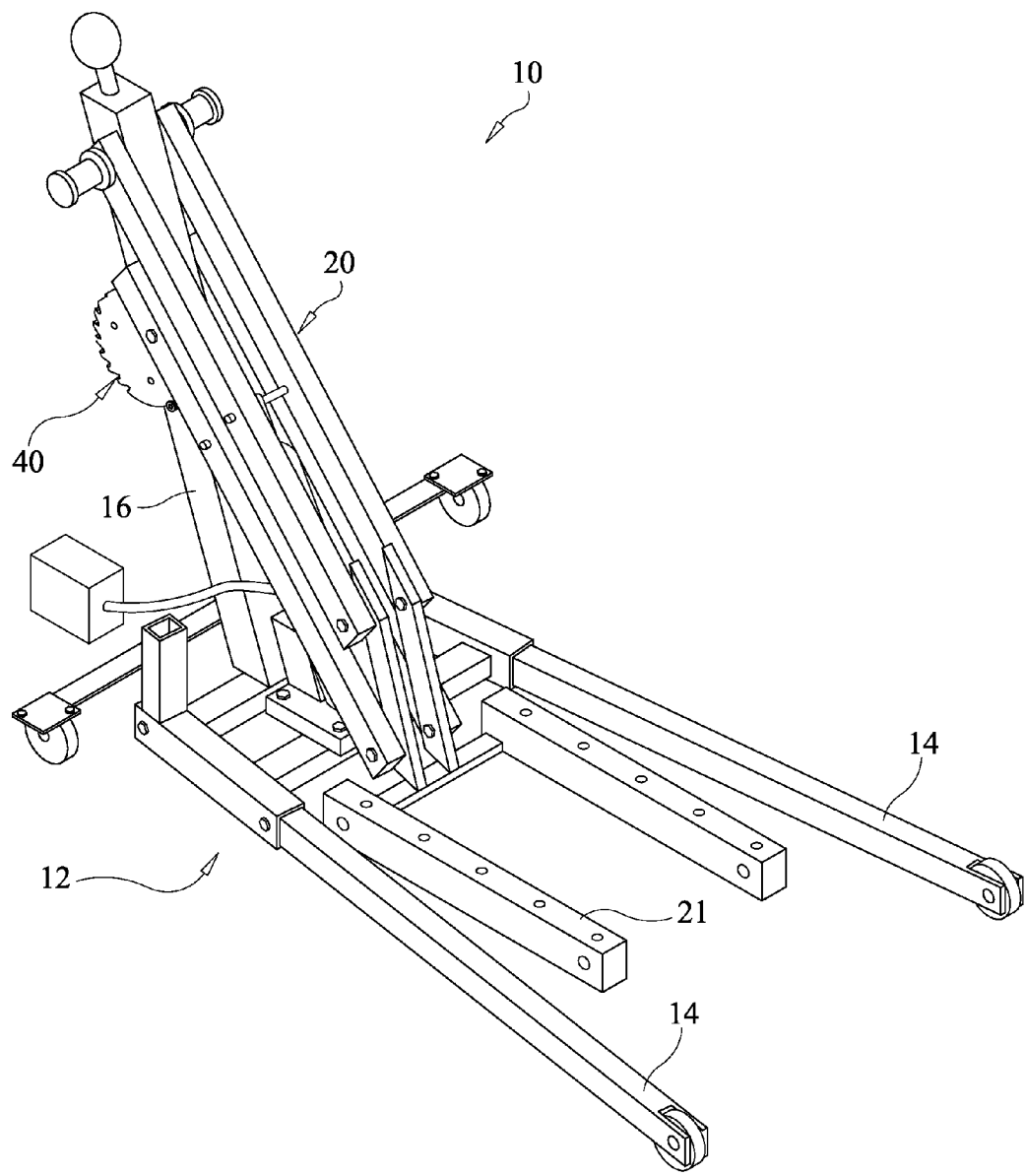
FIG. 3 depicts an improved lift for small vehicles with a ratchet height adjustment mechanism in a lowered position in accordance with the present invention.
Figure 4:
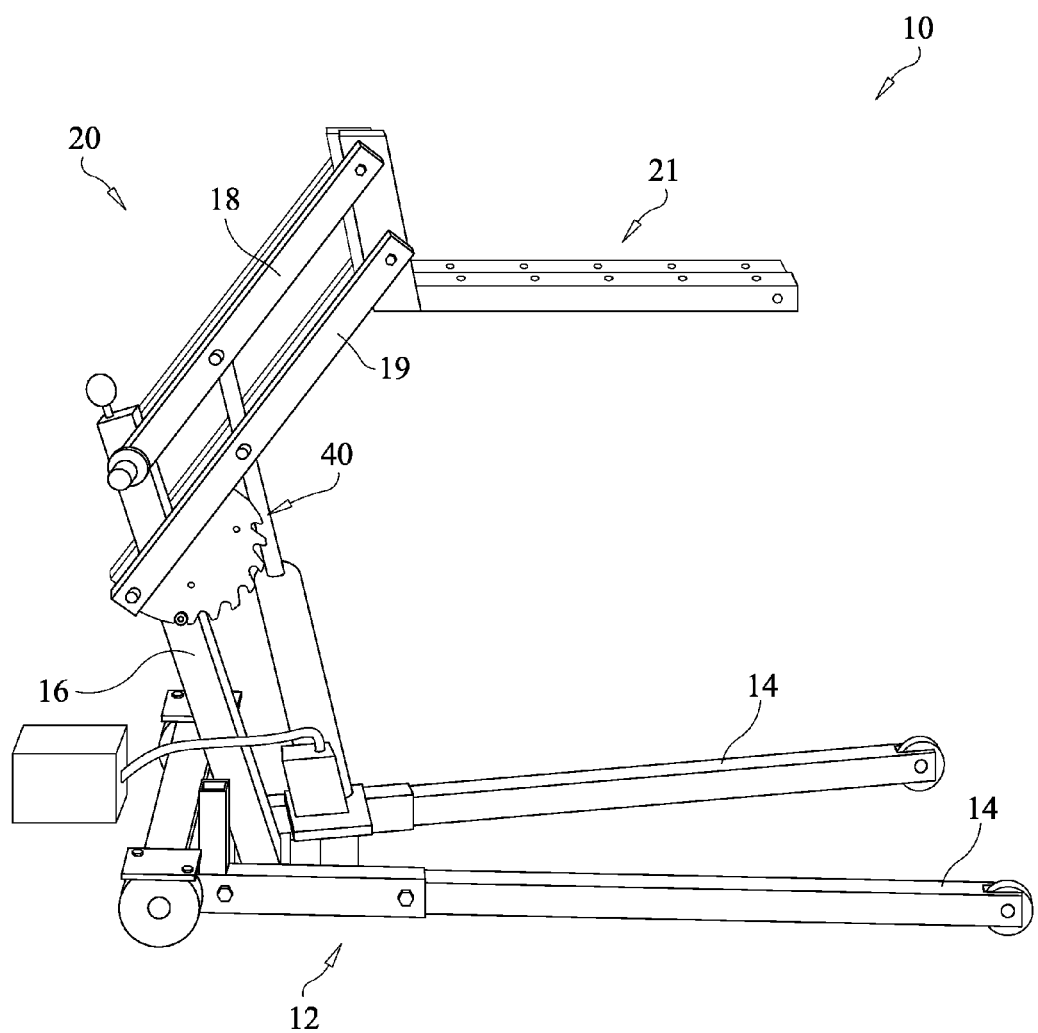
FIG. 4 depicts the lift in a raised position.

FIGS. 3 and 4 depict lift 10 in both lowered and raised configurations. Lift 10 includes a base frame 12 having forwardly projecting legs 14, and a vertical support post 16 extending upward from base frame 12. Support post 16 is preferably generally hollow and defines a generally square cross-section. A parallelogram linkage, generally referenced as 20, has a proximal end pivotally connected to support post 16 and a distal end. Parallelogram linkage includes a pair of upper members 18 and a pair of lower members 19, and a vehicle support structure 21 projects from the distal end of parallelogram linkage 20. A pneumatic cylinder provides force to elevate the lift when connected to a source of compressed air. The lift is lowered by allowing air to bleed from the cylinder in a controlled manner by actuation of a release valve. The overall structure of lift 10 is similar to that disclosed in U.S. Pat. Nos. 6,598,855 and 7,004,454, the disclosures of which are incorporated herein by reference.

Figure 5A:
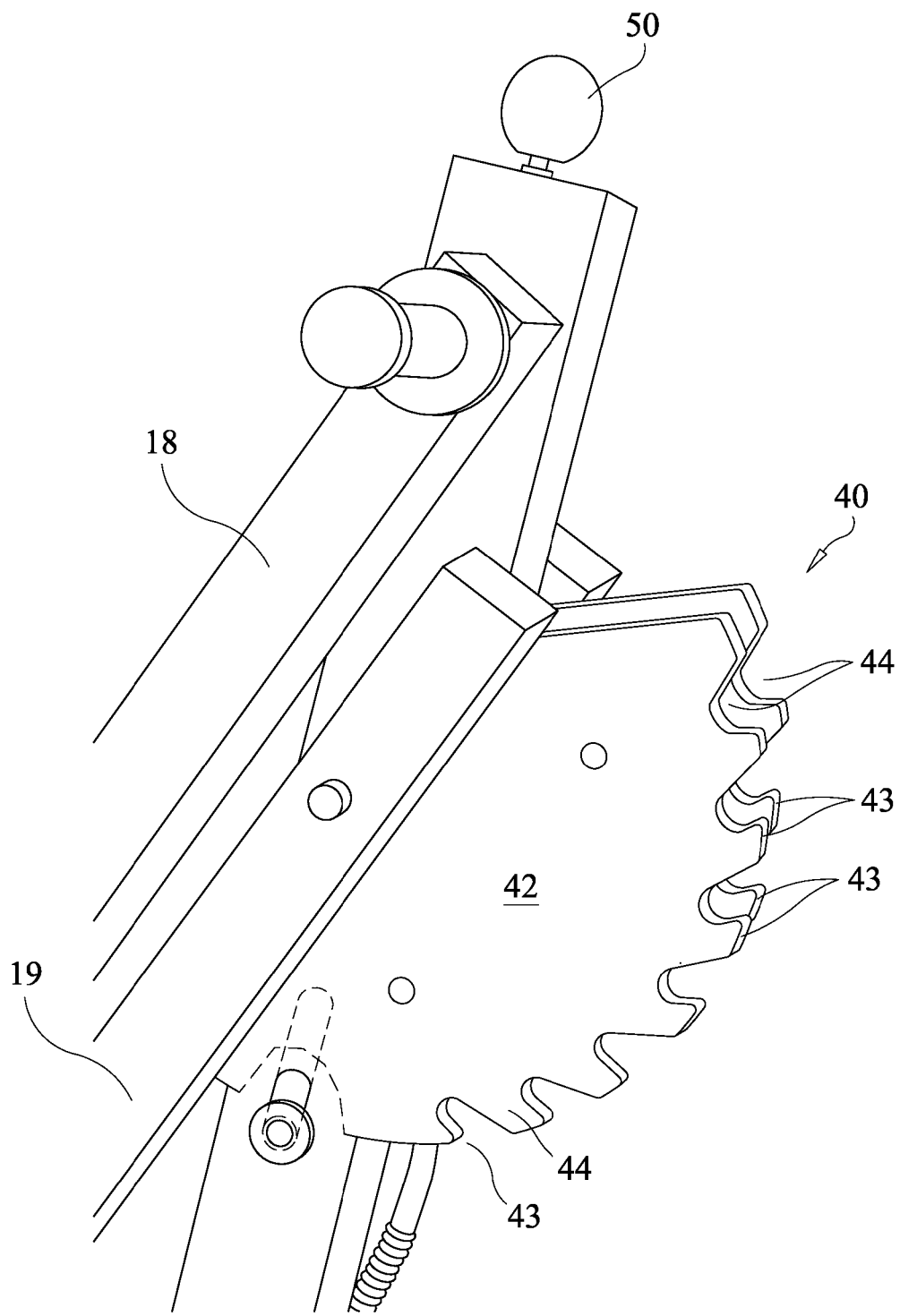
FIG. 5A is partial view of the improved lift in a lowered position detailing the ratchet height adjustment mechanism with the ratchet plate partially cutaway to reveal the elongate slotted aperture in the support tube in accordance with the present invention.
Figure 5B:
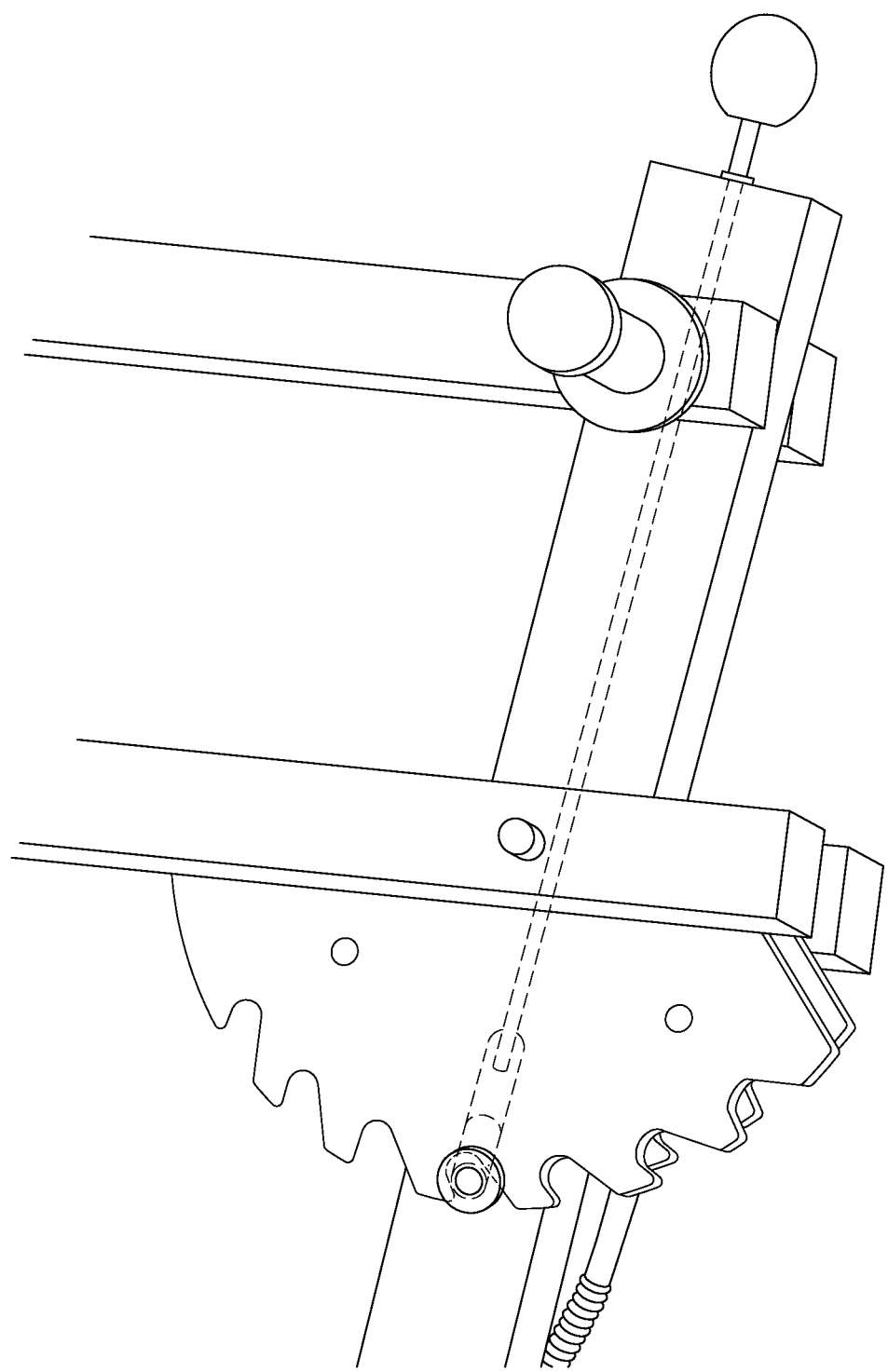
FIG. 5B is an alternate view of FIG. 5A showing the lift in an elevated position.
Figure 6:
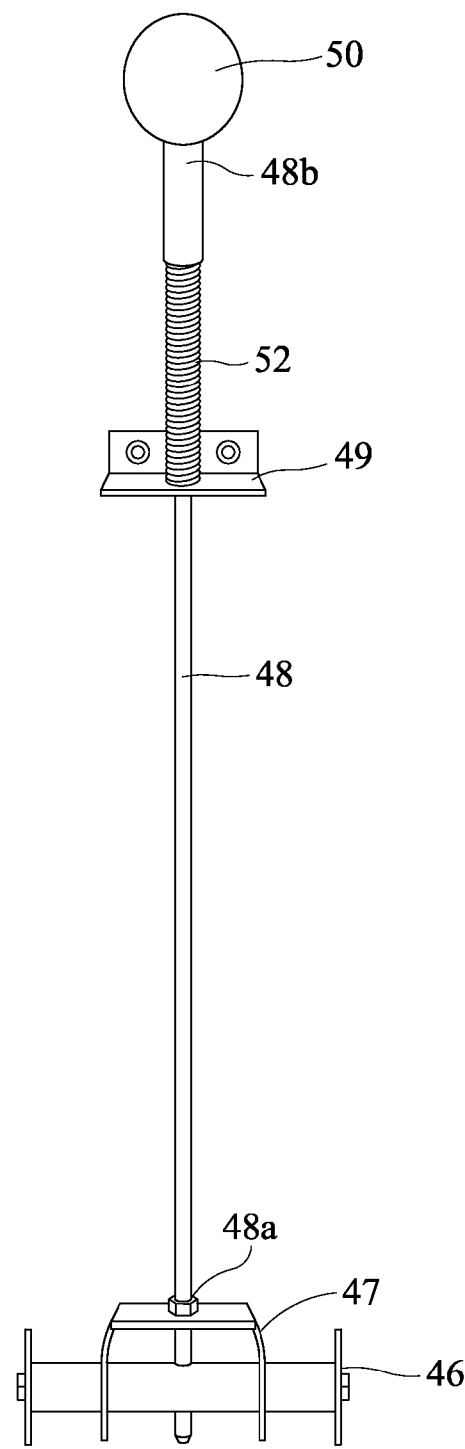
FIG. 6 is a detail view of the catch, carrier, and spring biased connecting rod assembly.

A significant aspect of the present invention involves adapting vehicle lift 10 with a automatic lift locking mechanism 40 providing ratchet assisted height adjustment as further illustrated in FIGS. 5A, 5B, and 6. Automatic lift locking mechanism 40 includes: (i) a pair of generally identical ratchet plates 42 that are affixed to lower link members 19, and (ii) a catch mechanism including a catch 46. Each ratchet plate 42 has a peripheral edge portion defining a plurality of teeth 43 defining recessed notches 44 therebetween. As noted above, support post 16 comprises a generally hollow member. Support post 16 is adapted with opposing sides each defining longitudinally disposed slotted apertures 17 (shown in hidden line). As best seen in FIG. 6, catch mechanism includes a catch 46 retained by a carrier 47 which rides within the support post, and opposing ends of catch 46 project from opposing sides of support post 16 through slotted apertures 17. The catch mechanism is spring biased to an upper position wherein such that catch 46 will automatically engage the toothed ratchet plate 42. A rod 48 has a lower/distal end 48a connected to carrier 47 and an upper/proximal end 48b projecting from the top of support post 16. A bracket 49 defines an aperture 49a through which a portion of rod 48 passes. The rod upper end 48b is preferably fitted with an actuation knob 50. A helical spring 52 is disposed in compression between knob 50 and bracket 49 and functions to bias carrier mechanism to an uppermost catch position. The catch mechanism is thus configurable between a generally retracted configuration wherein catch 46 engages ratchet 40 and an extended configuration wherein catch 46 disengages ratchet 40.

Figure 7:
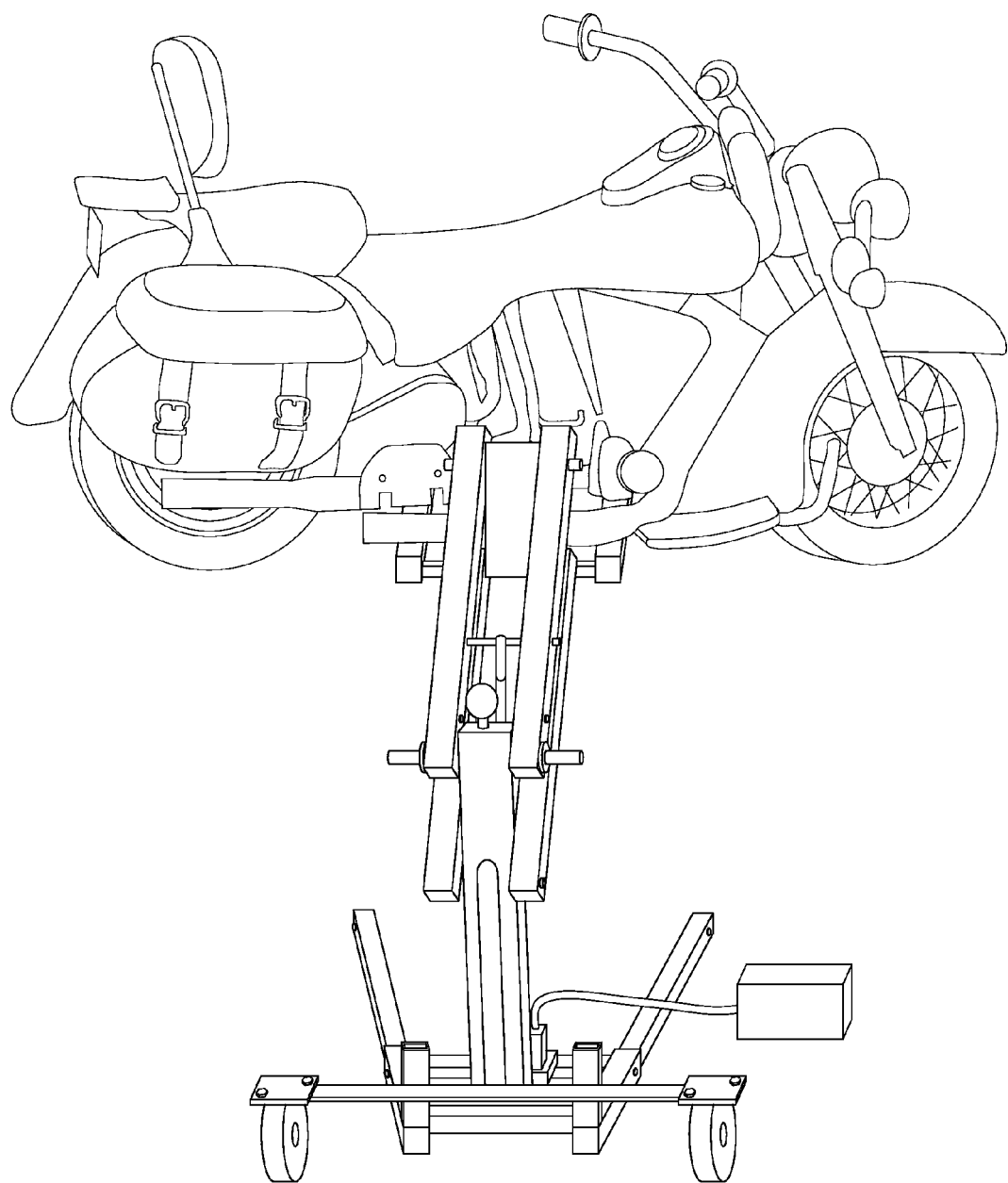
FIG. 7 is a rear view of the lift in the raised position supporting a motorcycle.
Figure 8:
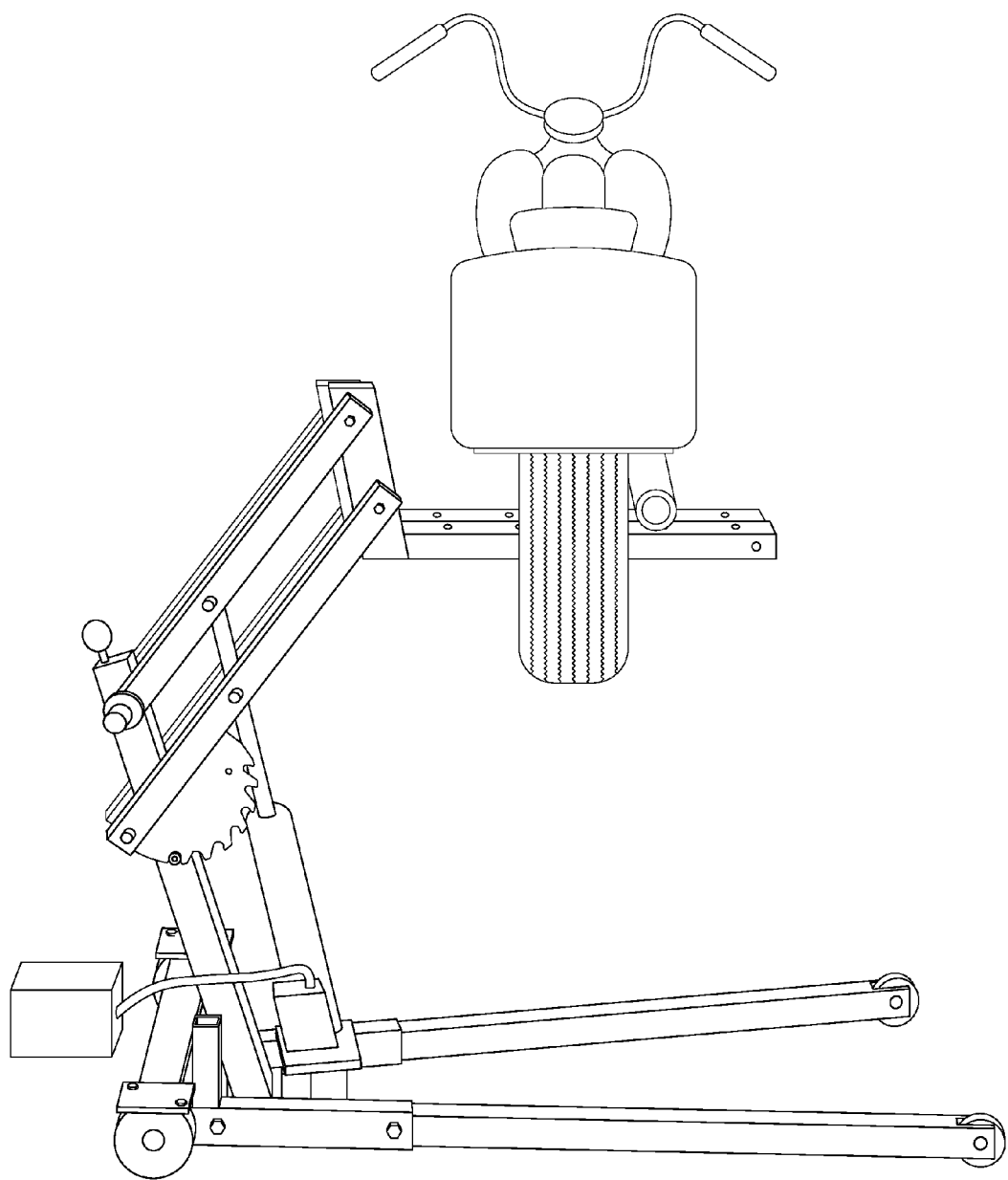
FIG. 8 is a side view thereof.

As should now be apparent, as vehicle lift 10 is raised from its lowered position, the parallelogram linkage 20, and particularly upper members 18 and lower members 19, pivot upward whereby ratchet plates 42 rotate relative to support post 16, and particularly catch mechanism 46. As the catch plates 42 rotate, catch mechanism 46 rides in and out of recessed notches 44 between adjacent pairs of teeth 43, with each groove representing a stop position. Once the user has raised the lift to a suitable height catch 46 remains disposed within a corresponding notch and held in place by the bias force applied to rod 48 by spring 52. In order to lower the lift, the user simply depresses knob 50 to overcome the spring bias force whererby rod 48 drives catch mechanism 46 downward thereby disengaging ratchet plates 42 such that the parallelogram linkage may be lowered. Lowering is further aided by controlled release of air from the pneumatic cylinder. FIGS. 7 and 8 depict vehicle lift 10 in a raised configuration supporting a motorcycle (shown in phantom) further illustrating use of the device.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. In a small vehicle lift apparatus having a base frame with forwardly projecting legs, a vertical support post extending upward from said base frame, a parallelogram linkage having a proximal end pivotally connected to the support post and a distal end, said distal end having a vehicle support projecting therefrom, wherein the improvement comprises an automatic lift locking mechanism including a ratchet plate connected to said parallelogram linkage, and a catch mechanism including a catch movably disposed within a slotted aperture longitudinally defined by said support post, said catch mechanism being spring biased such that said catch automatically engages said ratchet plate when said parallelogram linkage pivots upon raising said vehicle support, and a manual disengagement mechanism including a rod movably disposed and protected within said vertical post, said rod having a distal end connected to said catch and a proximal end projecting from the top of said post, said proximal end having an actuation knob attached thereto.

2. In a small vehicle lift apparatus having a base frame with forwardly projecting legs, a vertical support post extending upward from base frame, a parallelogram linkage, including a pair of upper members and a pair of lower members, each of said upper members and said lower members having a proximal end pivotally connected to the support post and a distal end, and a vehicle support projecting from the distal end of the parallelogram linkage, wherein the improvement comprises:

an automatic lift locking mechanism including ratchet plate connected to at least one of said lower members, said ratchet plate having a peripheral edge defining a plurality of notches;

a catch mechanism including a catch movably disposed within, and partially projecting from, a slotted aperture longitudinally defined by said support post, said catch being spring biased to automatically engage said ratchet plate upon raising of said vehicle support whereby said catch engages said ratchet plate by moving into one of said plurality of notches thereby preventing said vehicle support from lowering, and a manual disengagement mechanism having a rod protectively disposed within said vertical post, said rod having a distal end connected to said catch and a proximal end projecting from the top of said post, said proximal end having an actuation knob attached thereto, said rod configurable between a generally retracted configuration wherein said catch disengages said ratchet and an extended position wherein said catch engages said ratchet.

\* \* \* \* \*